Oct. 24, 1967   A. ALLGAYER   3,348,250
MACHINE FOR PULLING OVER, HEEL FORMING AND LASTING OF SHOES
Filed May 21, 1965   11 Sheets-Sheet 1

INVENTOR
August Allgayer
By Dicke & Craig
ATTORNEYS

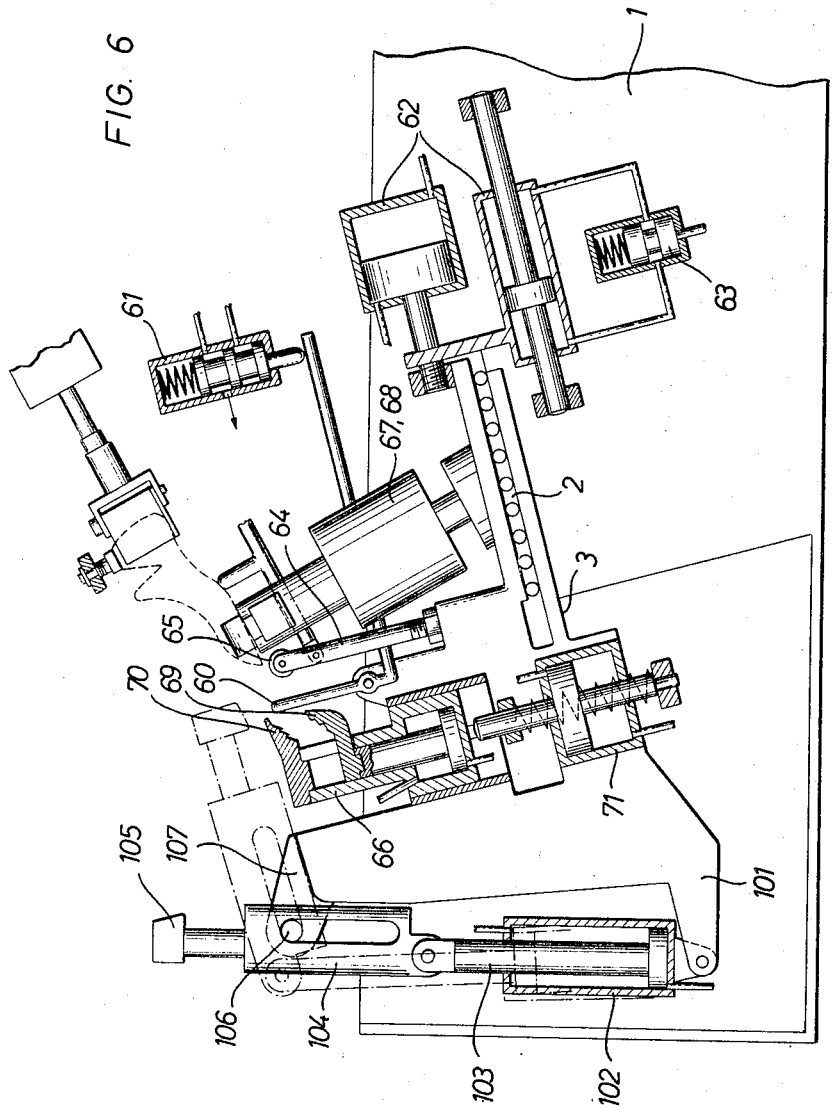

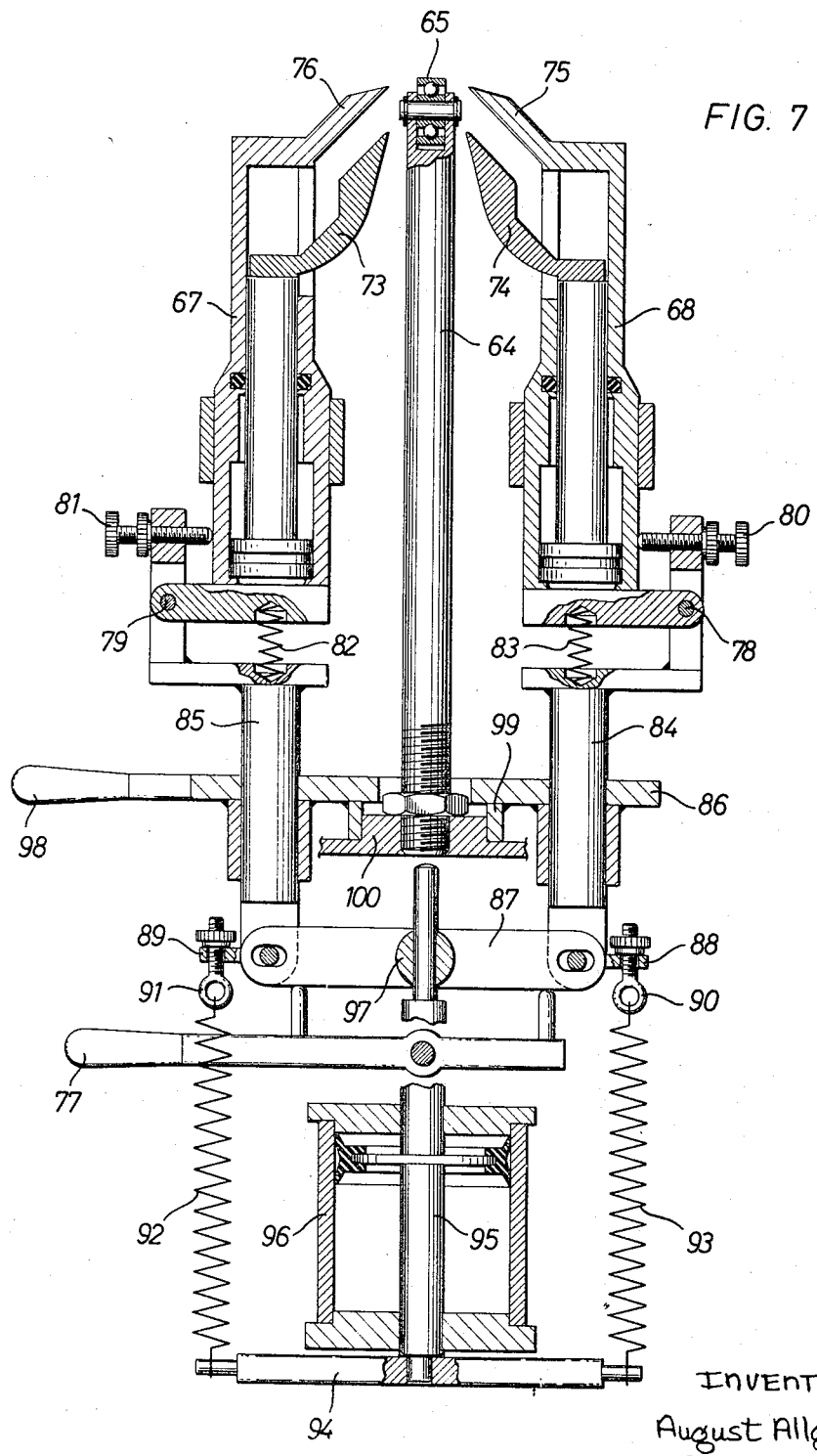

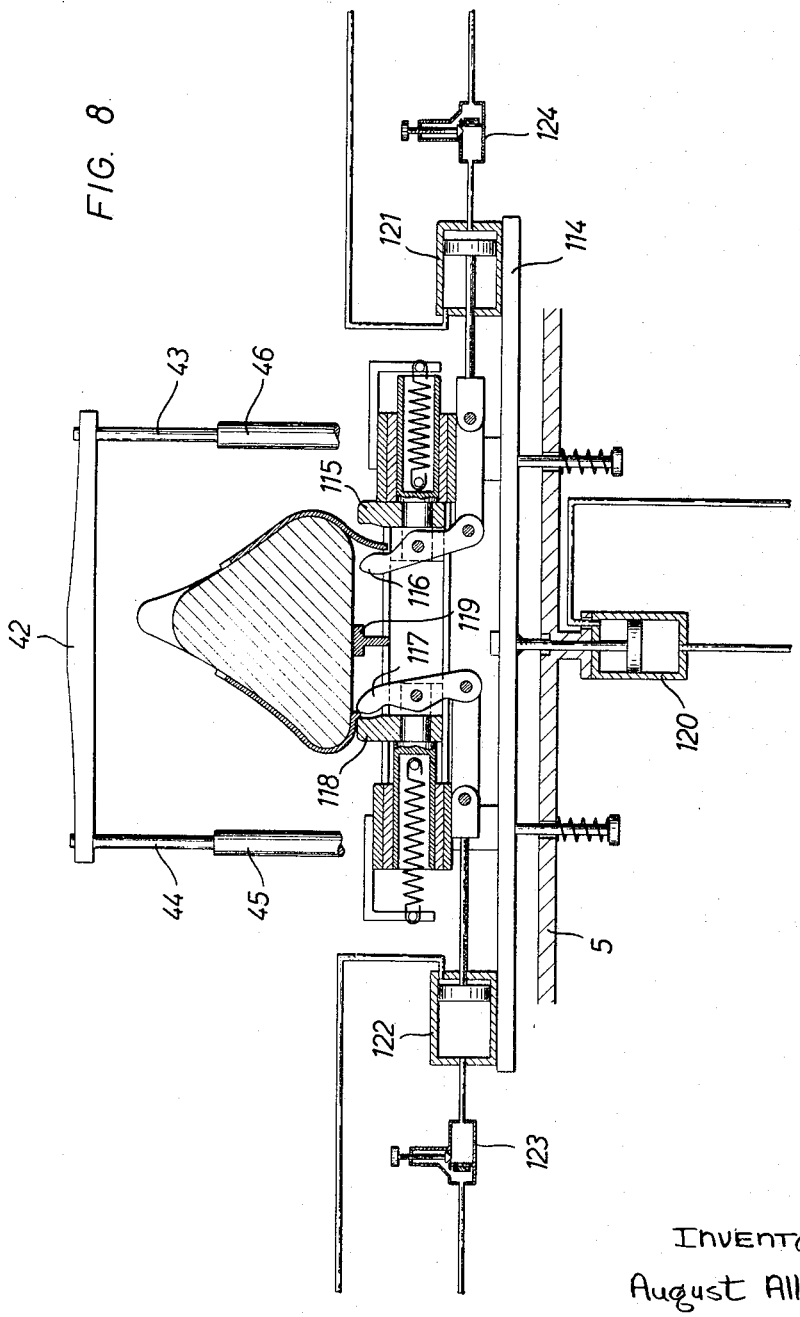

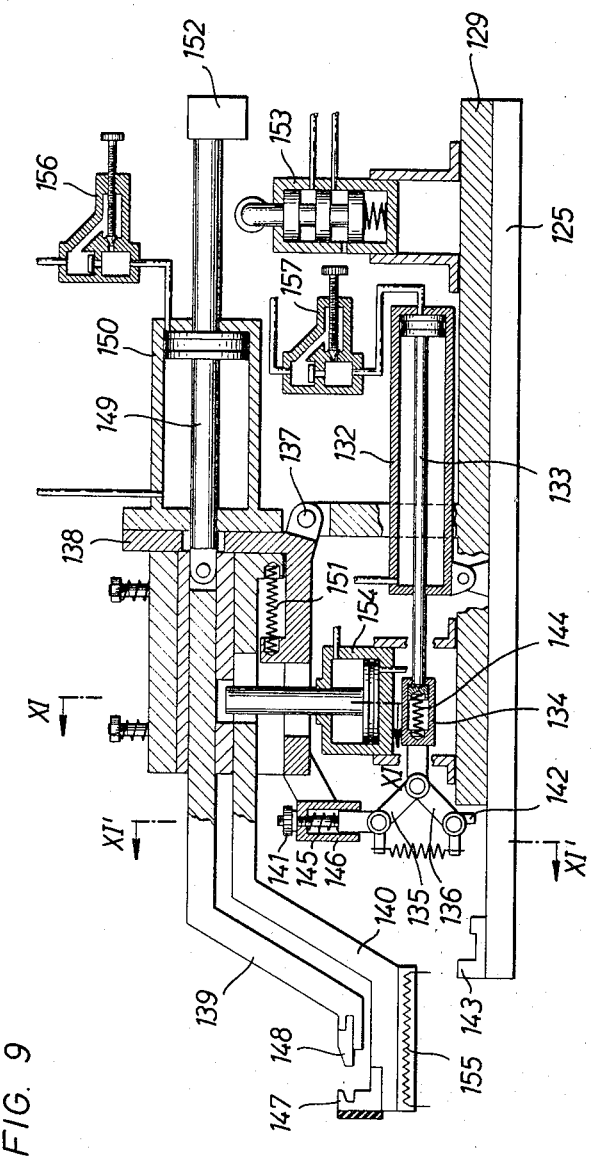

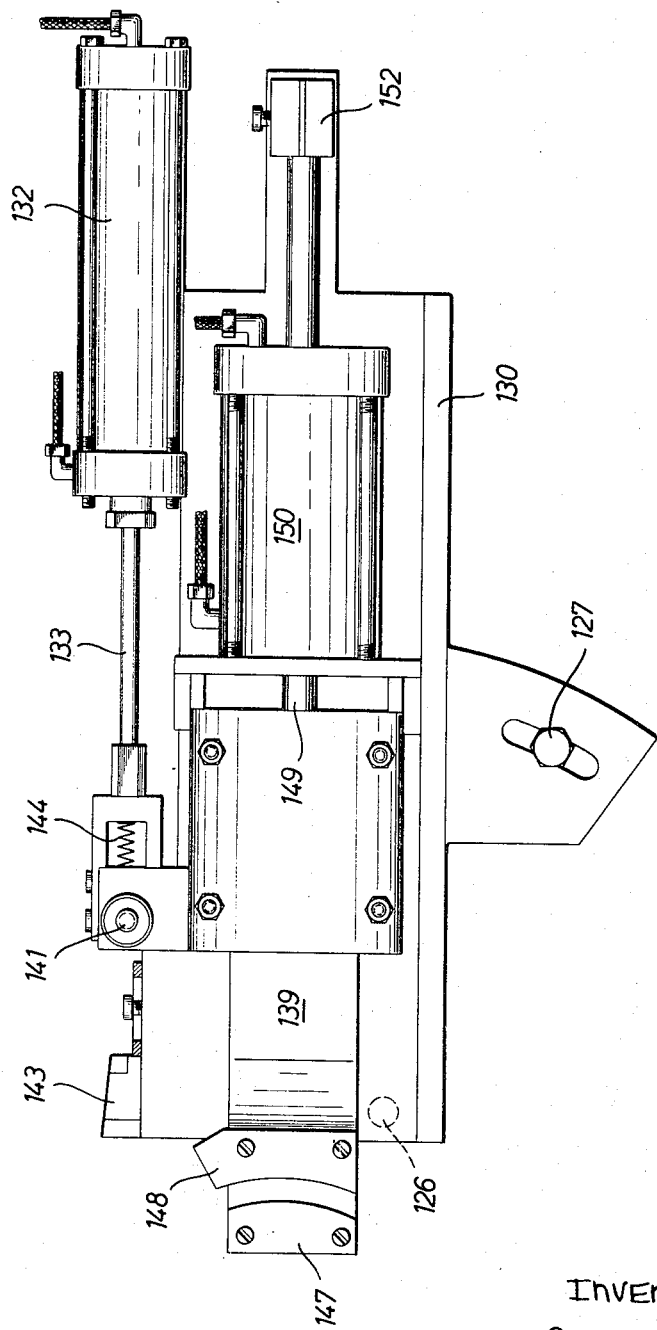

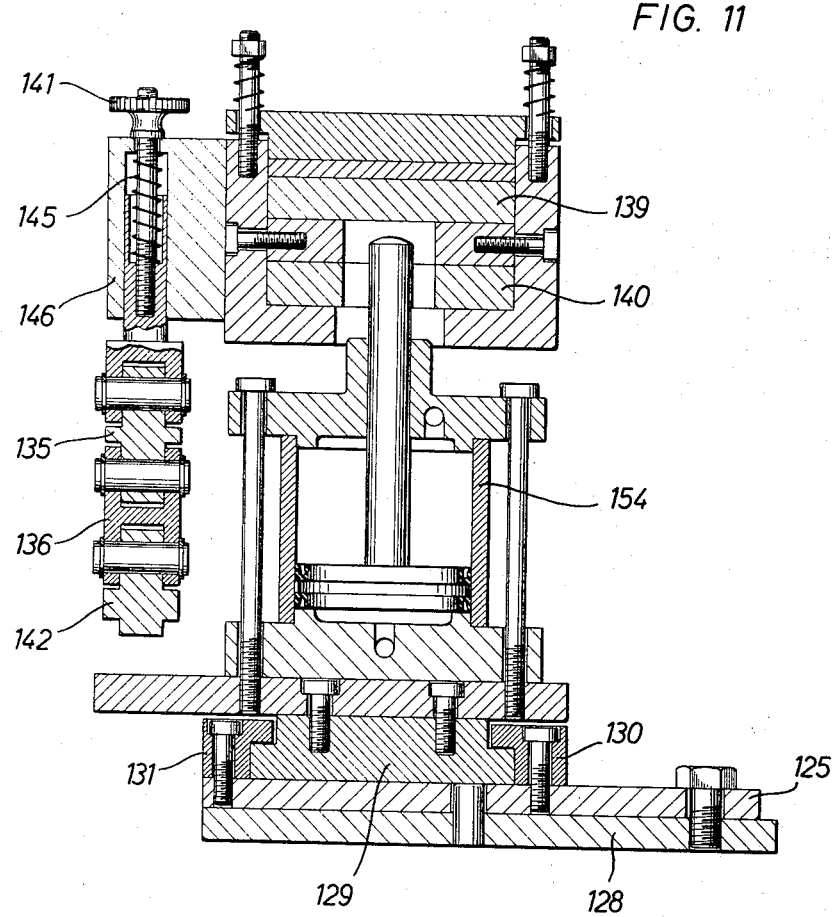

3,348,250
MACHINE FOR PULLING OVER, HEEL FORMING AND LASTING OF SHOES
August Allgayer, Alfeld, Leine, Germany, assignor to Schuhmaschinen-Gesellschaft Hanke & Co. m.b.H., Alfeld, Leine, Germany
Filed May 21, 1965, Ser. No. 457,580
Claims priority, application Germany, May 21, 1964, Sch 35,194
7 Claims. (Cl. 12—10.1)

ABSTRACT OF THE DISCLOSURE

The present disclosure relates to a machine for pulling-over, heel forming and lasting of shoes by means of glue within the area between the heel and the sides adjacent to the toe of the shoe and in a position in which the bottom surface of the last for the shoe upper faces downwardly. These operations are to be carried out while the last is clamped in a fixed position so that, when the shoe is removed from the machine, the upper of the shoe which is drawn over the last is firmly glued together with the insole from the heel up to the sides adjacent to the toe of the shoe and it will thereafter only be necessary to complete the production of the shoe on another machine by merely working on the toe portion of the shoe.

---

Although so-called combined lasting machines for carrying out the entire lasting operation of the shoe or for combining several conventional individual operations with each other are well known for many years and have even been used in actual practice, they did not succeed simply because it was generally regarded to be easier and more profitable to carry out the individual operations on separate machines even though this required the shoe to be repeatedly inserted into and removed from the respective machines. However, since new types of materials, especially plastics and adhesives, have now been developed, the shoe industry again considers the question of returning to the so-called combined lasting machines and of improving the same so as to be more profitable.

Thus, some time ago a so-called combined heel-forming and lasting machine has been developed which, by employing a special thermoplastic cap material, permits the upper of the shoe which is provided with this cap to be shaped exactly in accordance with the last. At the same time, this machine permits the heel part of the shoe to be lasted and the lasting margin of the upper to be secured to the insole. The rear cap is therefore no longer preshaped on a separate machine, but it is now only necessary to preheat this cap together with the heel part of the upper in order to attain a rear cap which will permanently retain its desired shape. The upper of the shoe is then applied around the last by hand, both parts are then inserted into the heel lasting machine, and finally the position of the upper on the last is checked once more. Thereafter, the machine carries out the shaping of the rear cap and the lasting of the heel part automatically. Shortly before the shaping and lasting operations, the upper is tightened in the machine around the last by means of three grippers in order to prevent any possible wrinkling of the material.

It is an object of the present invention to provide a machine for generally the same purposes as stated above which, however, is not only further adapted at the same time to pull-over the upper which is held under tension, but also to last the sides and the ball and shank parts and to secure this area of the lasting margin of the upper firmly to the insole by gluing.

For attaining this object, the present invention provides that the heel area of the last together with the upper is to be held in a fixed position on a first sliding carriage, hereafter called the heel carriage, so that the toe of the last faces the operator of the machine, that for the purpose of lowering the toe part of the last, the last together with the heel carriage may be pivoted to an inclined plane in which the holding and supporting means and the tools for working on the shoe bottom are located, and that these tools are mounted on a second sliding carriage, hereafter called the front carriage, which, after the last has been pivoted to the inclined plane, may be moved in a straight direction within this plane. Another advantageous feature of the invention consists in designing the machine so as to permit the heel carriage to be movable along a curved path or guideway and to be fixed to this guideway.

For adjusting the heel carriage which is mounted on the curved guideway so as to be in accordance with the particular shank slope of the shoe, it is advisable according to the invention to provide a hydropneumatic piston drive which is adapted, after the machine is started and the last is mounted in a fixed position relative to the heel carriage, to move the heel carriage to a position in which the front part of the last engages with a stop member on the front carriage which is adapted to control the operation of locking the heel carriage. When the last engages with this stop member, a check valve is actuated which prevents the level of the oil column from changing in the hydraulic cylinder. When the last is being released after the work has been completed, the heel carriage returns to its basic position which corresponds to the position in accordance with the shank slope of the flattest shoe to be made. In order to reduce the extent of the movement of the hydropneumatic piston drive as much as possible when shoes with an equal shank slope are to be produced, this drive is provided with a set-screw which limits these movements.

In order to facilitate the insertion of the front part of a shoe which is to be worked upon in the machine, the front carriage on which the necessary tools are mounted is adjustable in the longitudinal direction by means of a hydropneumatic piston drive and adapted to be locked in the adjusted position. When the machine is in its basic position, this front carriage is located in the direction toward the toe and at such a distance therefrom that the largest shoe which might be worked upon can still be easily inserted. After the last together with the upper has been mounted and the heel carriage which is movable along a curved path has been properly adjusted, the front carriage is moved in the direction toward the shoe heel until the toe of the shoe engages upon a further stop member which is provided on the cylinder for the operation of the toe gripper. When the toe engages upon this stop member, a check valve is close and the oil column of the hydropneumatic cylinder is locked in the latter so that the front carriage will remain fixed in this advanced position.

Above the position of the stop member for controlling the heel carriage, a rotatable roller should be provided for preventing the insole during the forward movement of the front carriage from being pushed together and damaged or for preventing the tip of the insole from being pinched.

Further features of the invention consist in the control of the working methods and the succession of operations of the machine, in the particular arrangement and construction of the heating plate which acts upon the heel part of the insole for the purpose of activating the coating of adhesive which is applied upon this heel part and for also activating the projecting edge of the shoe cap which is to be turned inwardly and to be lasted, and in the design of the heel saddle which permits shoes of any size with the same or similar heel shape to be worked upon without requiring any parts of the machine to be exchanged.

For controlling the operation of the machine, two valves are provided which may be operated by foot pedals, while several hand levers are provided for adjusting the positions of the tools relative to the workpiece during any phase of the various operations.

The piston drives for the operation of the individual tools are controlled by valves which, in turn, may be moved into and out of their operative positions by means of cam plates which are mounted on a control shaft. This control shaft is preferably likewise driven by a hydropneumatic drive unit both during the forward and return run of the machine.

Another important feature of the invention consists in the provision of means which permit the control shaft which is rotated by the hydropneumatic drive unit to be automatically stopped after every work cycle so as to permit an adjustment of the tools to be made when necessary for the following work cycle by means of hand levers which are especially provided for this purpose. The longitudinally movable piston rod of the hydropneumatic drive unit is for this purpose provided both for the forward and return movements with racks with ratchet-like teeth so that for each direction of movement two such racks are provided each of which has a tooth spacing which is offset by the distance of one half tooth relative to the corresponding teeth of the other rack. Each of these racks is associated with a locking pawl or the like which is operated by a pressure medium. These pawls are actuated so as to engage in alternate succession with the associated rack. The invention further provides means for locking both locking pawls in the retracted position so as to permit a continuous automatic succession of operations.

The step-by-step forward movement of the cam control shaft therefore permits adjustments to be made when necessary between two successive work cycles, while the step-by-step return movement of the control shaft permits any operations to be repeated if they were not carried out properly during the forward run.

According to one preferred embodiment of the invention, the machine which will be subsequently described in detail is preferably provided with a purely pneumatic control. The source of energy for the operation of the machine therefore consists of compressed air, and the hydropneumatic piston drives are likewise influenced by compressed air. It is, however, also within the concept of the invention to provide other than pneumatic sources of energy, for example, of a hydraulic, electric, or mechanical type.

A further component of the invention is the particular design and construction of the heel saddle. This heel saddle consists of a premolded solid block of rubber of a horseshoelike shape in accordance with the contour of a shoe heel. This heel saddle is inserted into a divided cage, the two equal parts of which are connected by a hinge-like engagement with each other and are provided with an elongated hole. Each hinge-like part of the cage carries an outwardly projecting arm upon which a crossbar is adapted to act for pivoting the two parts of the cage and the heel saddle therein toward each other.

When the heel saddle is moved against the heel part of the shoe, the saddle first engages resiliently upon the rear seam of the shoe and thereafter, when the adjustable spring force has been overcome, the sides of the shoe heel by saddle are pressed against the sides of the shoe heel by the pressure which is exerted by the crossbar upon the outwardly projecting arms. If the force which is exerted upon the sides exceeds a certain limit, the spring which acts upon the rear seam may yield in a direction away from the heel of the shoe. Since both jaws of the heel saddle are provided with elongated holes at the points where they are hinged to each other, they are also capable of yielding laterally to a certain extent. The heel saddle which is mounted within the heel cage can therefore always yield in any direction in accordance with the particular shape of the heel part of the shoe which is to be worked upon. This resilience in all directions permits the same heel saddle to be employed for properly shaping all heel parts of similar shapes.

As already mentioned at the beginning, the employment of thermoplastic caps requires these caps to be heated to permit them to be molded. Since a certain length of time elapses between the operations of inserting the shoe upper and of wiping and securing the heel area of the lasting margin, it is necessary to subject this area of the thermoplastic caps within the machine once more to a heating effect. Furthermore, the lasting margin of the cap lining or the coated side of the cap, if the cap has no lining, must be connected to the insole by gluing. The insole itself is for this purpose provided at least within the heel area thereof with a thermoplastic adhesive which is already applied upon the insole before the shoe is inserted into the machine. It is therefore necessary also to activate this area of the insole within the machine.

The invention therefore also provides that a horseshoe-shaped element which is adapted to be heated is to be applied around the support of the last. This heating element is adapted to be raised toward and lowered from the shoe. Immediately after the shoe has been mounted in the machine, this heating element is moved toward the heel bed and remains in contact therewith until the wipers turn the lasting margin of the heel upon the insole. In other words, the horseshoe-shaped heating element is returned to its basic position shortly before the first wiping operation is carried out.

The aforementioned as well as additional features and advantages of the present invention will become more clearly apparent from the following detailed description thereof which is to be read with reference to the accompanying drawings, in which—

FIGURE 6 shows a diagrammatic cross section of the front carriage and the associated tools;

FIGURE 7 shows a cross section of the lateral grippers for the pulling-over process;

FIGURE 8 shows a cross section of the shank grippers;

FIGURE 9 shows a longitudinal section of the ball wiping mechanism;

FIGURE 10 shows a top view of the ball wiping mechanism; while

FIGURE 11 shows a cross section of the ball wiping mechanism which is taken along the lines XI—XI and along the lines XI'—XI' of FIGURE 9.

Figure 1:
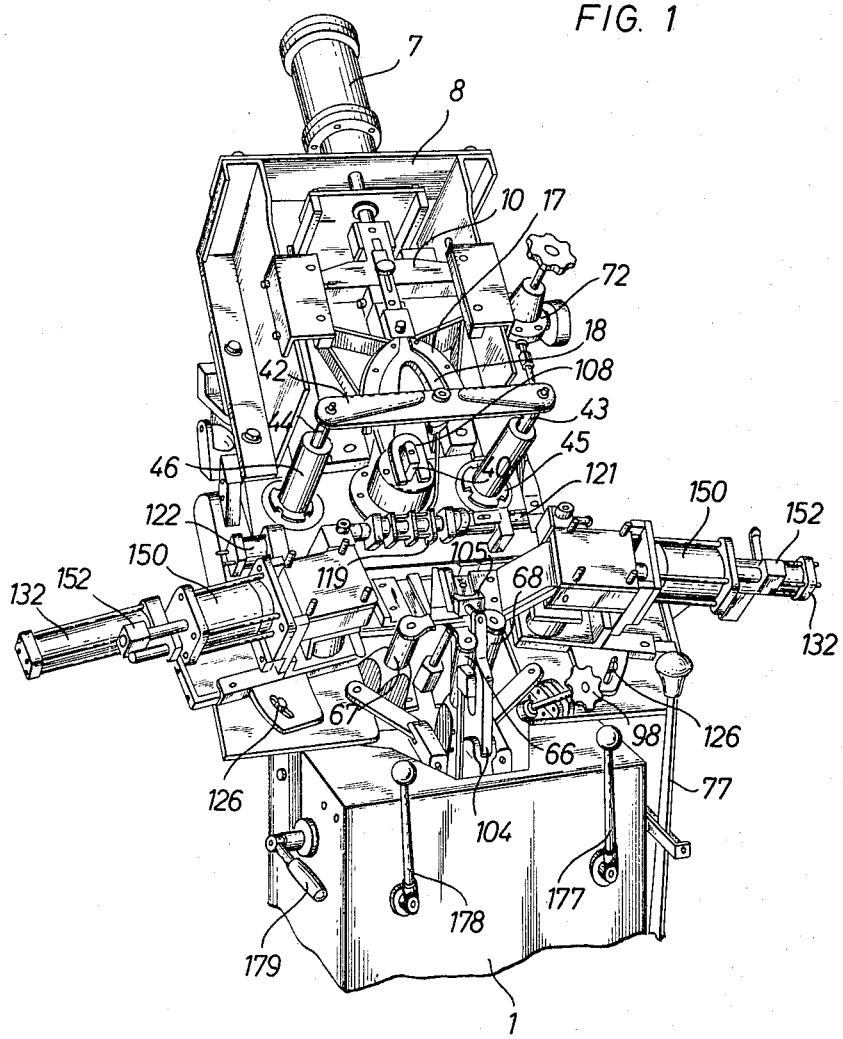
FIGURE 1 shows a perspective view of the upper parts of the machine.
Figure 2:
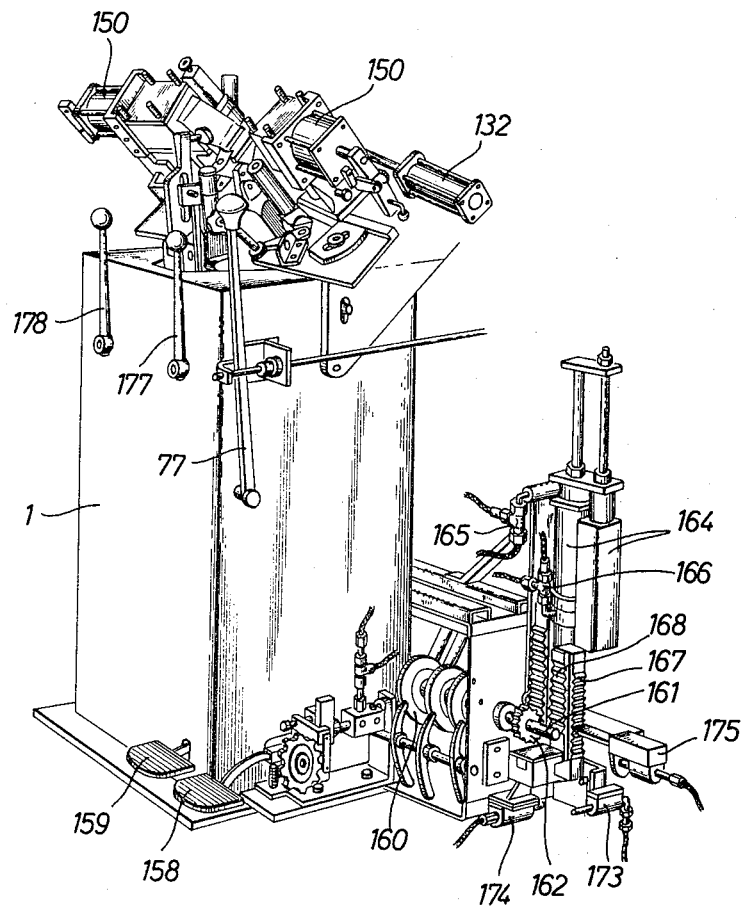
FIGURE 2 shows a perspective view of the lower parts of the machine.
Figure 3:
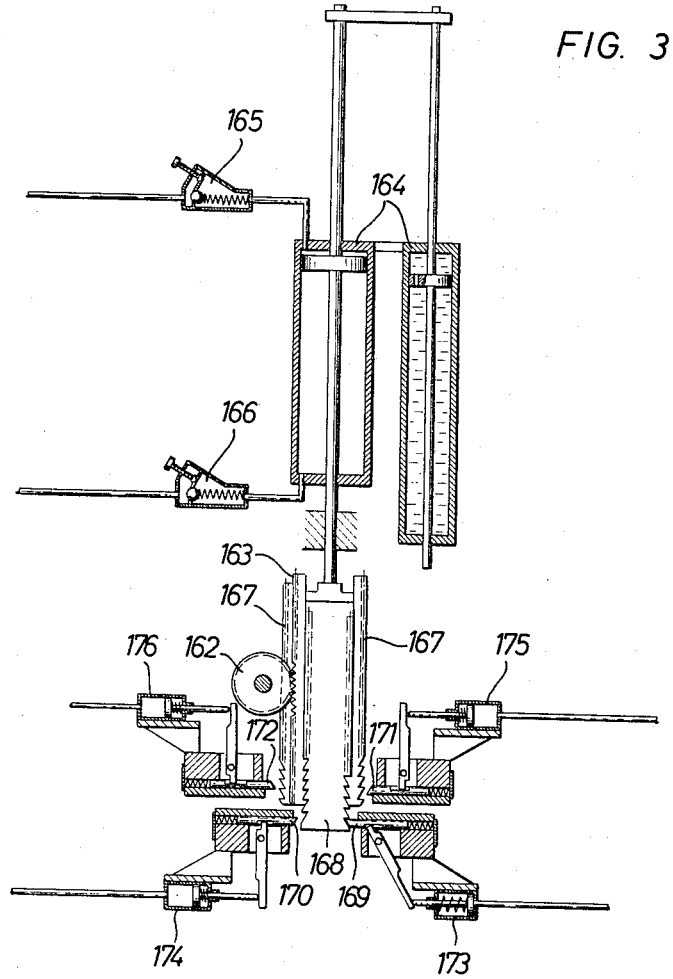
FIGURE 3 shows a diagrammatic illustration of the hydropneumatic drive unit for driving the cam control shaft.

As illustrated in the drawings, the machine according to the invention comprises a machine frame or housing 1 in which a front carriage 3 which is movable in the longitudinal direction of the shoe is mounted on guiding means 2 which extend in an inclined direction. The machine frame 1 is further provided with a curved guideway 4 for guiding the heel carriage 5. The theoretical center of this guideway 4 is located approximately at the point between the ball and shank areas of a shoe.

Figure 4:
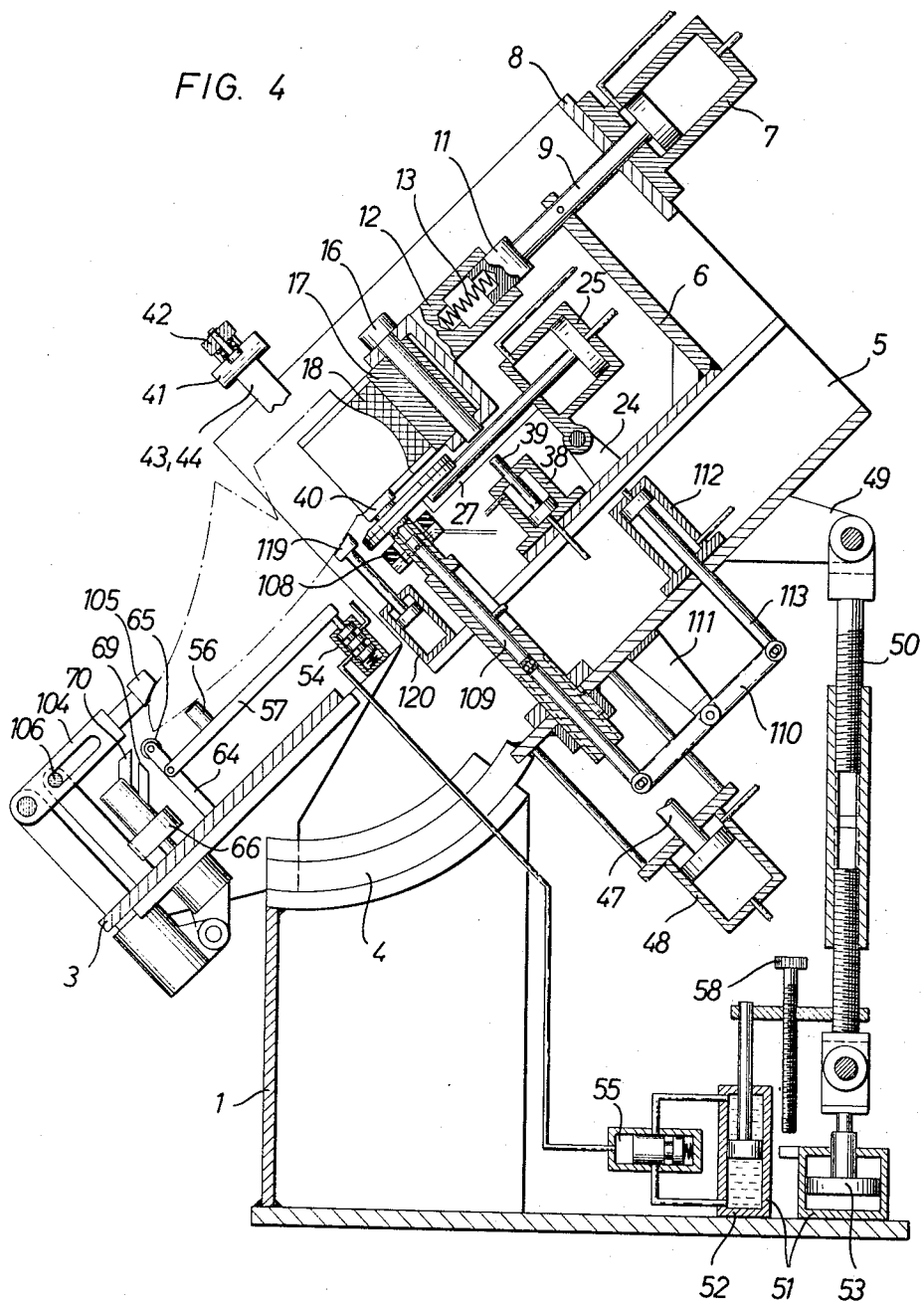
FIGURE 4 shows a diagrammatic cross section of the heel carriage and its associated means.
Figure 5:
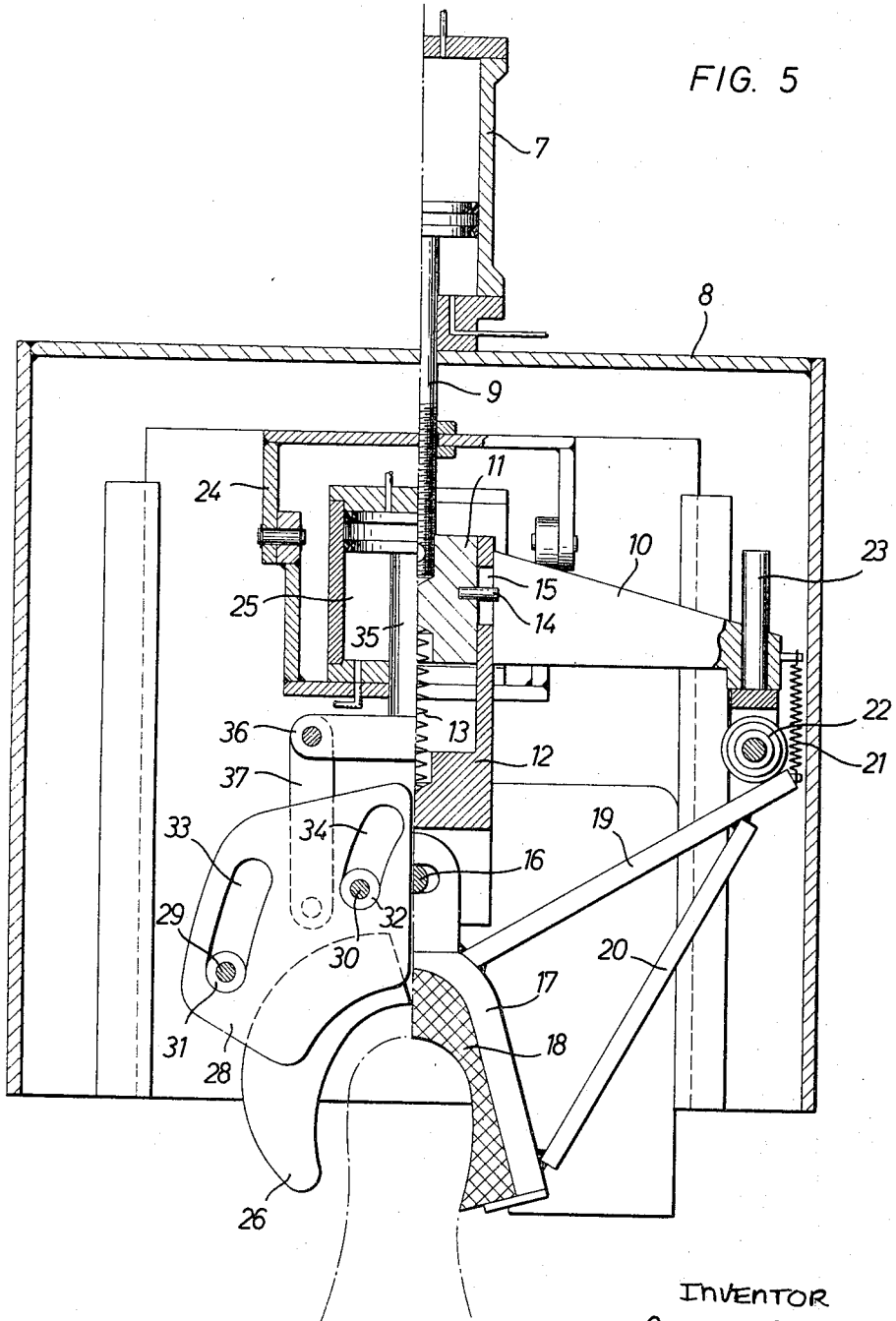
FIGURE 5 shows a top view partly in section, of the right side of the heel forming mechanism and of the left side of the heel lasting mechanism.

As illustrated particularly in FIGURE 4 and at the right side of FIGURE 5, a further carriage 6 is slidably mounted within the heel carriage 5 and is movable by means of a piston which is slidable within a cylinder 7, the flange of which is secured to a bracket 8 on the heel carriage 5. The piston rod 9 of this piston is connected to the carriage 6 and carries on its outer end a crossbar 10. This crossbar is mounted centrally thereof on a guide member 12 which is slidable on another guide member 12 which is connected to the piston rod 9. A compression spring 13 between the two guide members 11 and 12 tends to move the guide member 12 in the direction toward the heel of the shoe. The extent of this movement of the guide member 12 is limited by a pin 14 on guide member 11 which is slidable within a slot 15 in the wall of guide member 12 which surrounds the guide member 11. This pin prevents the guide member 12 from being forced out of the guide member 11.

Guide member 12 has a flat front end and a bore therein in which a pin 16 is mounted which carries the two halves of a cage 17 which contain a heel saddle 18 and are pivotally connected to each other and provided with elongated holes so as to permit them to yield laterally relative to the bolt 16. Each cage part 17 carries a pair of jiblike arms 19 and 20, one of which, the arm 19, is drawn by a tension spring 21 against a roller 22 so as normally to maintain the heel saddle 18 in the open basic position. This roller 22 is rotatably mounted within the bifurcated head of a pin 23 which is inserted into a bore in the outer end of the crossbar 10.

The left side of FIGURE 5 illustrates the heel wiping mechanism which is located underneath the heel saddle and is pivotably suspended by means of a pivotable cylinder 25 on a bracket 24 which is secured to the carriage 6.

When the piston in cylinder 7 is acted upon by the pressure medium and is moved forwardly, the pivotable cylinder 25 is likewise moved forwardly so that during the movement of the heel saddle 18 until it engages with the heel of the shoe, the distance at the end of the heel between the heel wiper 26 and the heel saddle 18 always remains the same. This distance may be varied in accordance with the particular requirements by suitable adjusting means, not shown. The pivotable cylinder 25 carries guide plates 27 in which the wiper jaws 28 are mounted. The guide plates 27 further support the pins 29 and 30, on the upper ends of which the rollers 31 and 32 are mounted which are slidable in cam slots 33 and 34 so as to effect a closing movement of the heel wipers 26.

For producing this closing movement, piston rod 35 which is projecting from the cylinder 25 carries a crossbar 36, the outer ends of which are pivotably connected to one end of a pair of arms 37, the other ends of which are pivotably connected to the wiper jaws 28.

Since the cylinder 25 which carries the heel wiping mechanism is pivotably mounted, the wiping means have the tendency to drop downwardly. The distance of this movement is limited by the piston rod 39 of the cylinder 38. When this piston rod is moved outwardly of the cylinder 38, the heel wipers will be moved to their operating position.

The heel carriage 5 carries the support 40 for the last L on which the heel part of the last is mounted together with the insole. The last is clamped down by means of a clamping plate 41 which is preferably provided with a pin which engages into the cover of the last when the latter is being secured in place. The clamping plate 41 is secured to a crossbar 42 which, in turn, is connected to the tension bolts 43 and 44 which are slidably guided in guides 45 and 46 and connected to the piston rod 47 of cylinder 48 underneath the bottom of the heel carriage by means of a crossbar, not shown. When a pressure medium is supplied to the cylinder 48, the clamping plate 41 is moved toward the upper side of the last L until it is firmly clamped for the following operations.

The heel carriage 5 which is slidable in its guideway 4 is provided with an arm 49 to which an adjustable rod 50 is pivotably connected. The lower end of this rod 50 is pivotably connected to a hydraulic drive unit 51 and rests on the oil column in the cylinder 52. The pneumatic cylinder 53 is controlled by a valve 54 which also controls at the same time the operation of the piston of the check valve 55.

Valve 54 is, in turn, controlled by a rod 57 which has an abutment 56 which is acted upon by the clamped shoe as soon as the front part thereof engages with this abutment.

When the machine is in the basic position, the upper side of the pneumatic cylinder 53 is therefore always under pressure so that the drive unit maintains the heel carriage 5 in a slightly inclined position. The degree of this inclination is adjustable by means of a setscrew 58 and it serves primarily for the purpose of reducing the length of travel for the pivoting movement of the heel carriage when shoes with an approximately equal shank slope are being worked upon, since otherwise this carriage would in the basic position return to the lowest shank slope and therefore be slightly inclined. For working on a shoe with a high shank slope it would therefore have to be pivoted for a considerable distance. The movement of the heel carriage together with the shoe clamped thereon to the proper working position of the shoe bottom relative to the front carriage 3 is produced by the air pressure which acts upon the lower side of the piston in the cylinder 53 and is supplied by a valve, not shown, which is controlled by the cam control shaft of the main drive.

As soon as the clamped shoe has been adjusted to its proper position in accordance with its shank slope by means of the mentioned hydraulic drive unit, the front slide 3 which carries all of the required tools for working upon the front part of the shoe is moved by a further rotation of the cam control shaft toward the toe of the shoe until the stop member 60 engages upon the latter. As soon as this occurs, the check valve 61 is closed and the hydropneumatic feed unit 62 is stopped since this valve at the same time also blocks the valve 64 so that the piston in the cylinder for the front part will be held on an incompressible oil column.

This front cylinder carries a rod 64 with a roller 65 on its upper end. This roller 65 serves for preventing the insole which is secured to the last from being shifted or crushed when the front carriage 3 moves in the direction toward the toe. This constitutes an essential feature of the present invention.

For carrying out the pulling-over process, the front carriage is provided with a toe gripper 66 and two lateral grippers 67 and 68.

During the following work cycle, at first the toe gripper 66 is closed, and for this purpose the movable gripper arm 69 is shifted toward the fixed gripper arm 70 and firmly grips the upper at the toe. The toe gripper 66 may be shifted in lateral directions so as to permit the upper to be adjusted.

The next work cycle consists of drawing out the upper at the toe by an operation of the cylinder 71. The pressure for this cylinder may be varied in accordance with the properties of the material by means of a pressure-reducing valve 72.

The lateral grippers 67 and 68 are closed during the next work cycle and for this purpose the movable gripper arms 73 and 74 are shifted toward the fixed gripper arms 75 and 76. For adjusting the upper, the closed grippers may be vertically adjusted relative to each other during this and also during the following work cycle by means of a hand lever 77.

For adjusting the lateral grippers 67 and 68 to the required width of the shoe, these grippers are pivotably mounted on pivot pins 78 and 79 and adjustable by means of setscrews 80 and 81 and they are maintained in the adjusted position by the action of the compression springs 82 and 83. Pivot pins 78 and 79 and setscrews 80 and 81 are mounted on supporting members 84 and 85 which are slidable within a guide member 86 and connected at their lower ends to a balancing lever 87. The lower ends of the supporting members 84 and 85 are further provided with lateral extensions 88 and 89 on which adjustable eyes 90 and 91 are mounted to which the upper ends of tension springs 92 and 93 are connected, the lower ends of which are connected to the outer ends of a rod 94 which is secured to the piston rod 95 of a cylinder 96. This piston rod extends through both end walls of cylinder 96, and its other end carries the pivot pin 97 of the balancing lever 87. When the piston in cylinder 95 is acted upon, the closed lateral grippers are moved downwardly, but this movement does not occur directly, but through the adjustable tenison springs 92 and 93.

The lateral grippers may be further acted upon by a hand lever 98 which permits the upper also to be shifted in the longitudinal direction toward the front and toward the rear relative to the last. The guide member 86 is for this purpose provided with an annular projection 99 which engages over a projection 100 on the front cylinder.

A toe supporting cylinder 102 is pivotally mounted on an arm 101 of the front carriage 3, and the piston rod 103 of this cylinder is pivotably connected to a slotted lever 104 which carries on its outer end a toe pressure member 105. Lever 104 is slidable on a stationary pin 106, and its outer side is slidable around a cam 107 which forms a part of the front carriage 3. When the piston rod 103 moves upwardly, lever 104 with the toe pressure member 105 thereon is moved along the cam 107 toward the toe of the shoe until it is applied thereon. Lever 104 is then in the position as indicated in dot-and-dash lines in FIGURE 6. It may be pointed out already at this time that this movement of the toe pressure member 105 does not occur until the ball tools which will be later described have been moved to a position underneath the shoe bottom.

The support 40 for the last is surrounded by a horseshoe-shaped heating plate 108 which is provided for activating the heel area of the insole and of the projecting lasting margin of the upper and of the heel cap. This heating plate is secured to a connecting rod 109, the lower end of which is pivotably connected to a lever 110. This lever is pivotably mounted on a bracket 111 which is secured to the heel carriage 5. The heel carriage 5 further carries a cylinder 112, the piston rod 113 of which is connected to the other end of the lever 110.

When the pressure medium is supplied to the cylinder 112, the heating plate 108 is moved toward the heel bottom of the insole and carries out the activation of the respective parts as previously described.

When the heel carriage 5 is in its basic position, it carries a supporting plate 114 which supports the shank lasting mechanism, as shown in FIGURE 8, which is provided with tong-shaped clamping members 115, 116, 117, and 118. In a separate work cycle, the shank lasting mechanism in which the clamping members are in the open position is at first moved upwardly by means of the cylinder 120 until the shank stop 119 engages upon the shank of the shoe. In the following work cycle the lateral cylinders 121 and 122 are actuated, whereby the clamping members 115, 116, 117, and 118 at first grab the lasting margin. When the piston rods of the cylinders 121 and 122 are then moved further inwardly, the clamping members apply the lasting margin against the bottom of the last and firmly glue the same. By means of the throttle valves 123 and 124 which are associated with the cylinders 121 and 122 a mild wiping movement is carried out on the shank.

The front carriage further supports another unit in the form of the ball wiping mechanism. The construction of this mechanism is illustrated in FIGURES 9 to 11. The base plate 125 is pivotable about a pivot pin 126 on a supporting plate 128 of the front carriage 3 and may be locked thereto by a screw 127. The entire ball wiping mechanism as such is mounted on a slide plate 129 which is slidable between a pair of guide strips 130 and 131 along the base plate 125. The movement of slide plate 129 together with the parts thereon is effected by the small cylinder 132 which is pivotably connected to the base plate 125. The outer end of the piston rod 133 of this cylinder carries a head 134 which is resiliently connected thereto and, in turn, carries a pair of toggle levers 135 and 136. The toggle lever 135 is pivotably connected to one end of a housing 138 which is pivotable at its other end on a pivot pin 137 and may be adjusted together with the arms 139 and 140 to different elevations by means of a setscrew 141. These parts may also be raised toward the bottom of the last by a straightening of the levers 135 and 136 when the piston rod 133 has moved the ball lasting mechanism so far that the nose 142 engages upon the adjustable stop 143. The compression spring 144 within the head 143 and the compression spring 145 within the head 146 are provided to effect a certain pressure balance.

By the action of the pressure medium upon the piston in the cylinder 132, the ball support 147 is therefore first moved underneath the bottom of the last within the ball area thereof and later, when the levers 135 are straightened, it is moved upwardly to support the ball. This operation occurs within a separate work cycle.

The lasting margin which projects within the ball area engages into the space between the ball support 147 and the ball wiper 148. During the following work cycle, the ball wiper 148 which is mounted on the arm 139 is moved by the piston rod 149 toward the recess in the ball support 147 and thereby clamps the lasting margin in a fixed position. Since the piston rod 149 of cylinder 150 continues its forward movement, the clamped lasting margin is drawn around the insole with a slight tension. However, due to the compression springs 151, the clamping force between the ball wiper and the ball support is maintained within suitable limits.

As soon as the lasting margin which is held by the ball support and the ball wiper has been placed for a few millimeters around the edge of the insole, the adjustable stop 152 is moved against and actuates a valve 153. The piston rod of the cylinder 154 is then moved upwardly and presses the ball wiper 148 on the arm 139 firmly against the shoe bottom. The continuously proceeding wiping operation therefore increases considerably after the pressure medium starts to act upon the piston in cylinder 154, so that the lasting margin will be firmly connected to the insole. Since due to the continued movement of the piston rod 149 of cylinder 150 the lasting margin gradually slips out of its clamped position between the ball support and the ball wiper, it will be firmly pressed by the lower surface of the wiper against the bottom of the insole. The compression spring 151 is adjustable in accordance with the quality of the material of the shoe upper, whereby another clamping force is produced in accordance with the tension of this spring. The ball support 147 is provided with a heating device 155 for activating the glue which is applied on the insole.

In order to move the piston rods of the cylinders 132 and 150 slowly, they are associated with adjustable throttle valves 156 and 157.

The ball wipers 148 and the shank tools 115, 116, 117, and 118 together with two heel wipers 26 form an uninterrupted surface along the shoe bottom so that this entire area of the shoe will be completely wiped when the shoe leaves the machine.

The operation of the machine occurs in the form of individual work cycles. For this purpose, the machine is provided with a control shaft 161 on which exchangeable cam plates 160 are mounted and which may be rotated for the forward and return movements by a hydropneumatic drive unit 164 through a rack 163 and a gear wheel 162. In order to permit the speed of this drive unit 164 to be regulated, a pair of throttle valves 165 and 166 are connected thereto.

The piston rod of this drive unit is further provided with two sets of serrated locking members 167 and 168 which are intended for the return movement and for the forward movement respectively. The opposite teeth of each of these locking members are offset by one half tooth relative to each other so that the opposite locking pawls 169 and 170 and the opposite locking pawls 171 and 172 will alternately engage with these teeth. For the locking movement, pawls 169 to 172 are actuated by spring force, while for the releasing movement each of them is actuated by a pneumatic cylinder 173, 174, 175, or 176, respectively.

If the machine should move forwardly, the locking pawls 171 and 172 which are intended for the return movement are retracted by the operation of the cylinders 175 and 176. On the other hand, if the machine should move backwardly, the locking pawls 169 and 170 are retracted by the operation of the cylinders 173 and 174.

However, both during the forward and return runs of the machine only one or another locking pawl is always in engagement with the respective locking member. The spacing of the teeth of the locking members is designed so that the cam plates which actuate the valves can carry out the required control movements in accordance with the length of time of the movements of the pistons in the associated cylinders.

When the machine is in its basic position and should be started to carry out the first work cycle, the right foot pedal 158 should first be depressed, whereby via the valves 173 the drive unit 164 is started. Valve 173 then retracts, for example, the locking pawl 169 from the locking member 168, while at the same time the locking pawl 170 is moved toward this locking member. The drive unit 164 then moves forwardly until it has traveled for a distance of one half division when the engagement of the locking pawl 170 prevents the further movement of the drive unit.

For the next work cycle the left foot pedal 159 is depressed which likewise actuates a valve, not shown. Starting with the second work cycle, this valve actuates the two cylinders 173 and 174 in alternate succession. Therefore, when the foot pedal 159 is depressed, the machine carries out successively one working step or work cycle after the other. If after completing one work cycle the operation of the machine should be reversed, the right foot pedal 158 is to be depressed. The reverse movement is then effected after a lag of only one work cycle by the rack 167 which acts in the opposite direction.

The machine is, however, also provided with additional control valves, the actuation of which permits all operations to carried out automatically in a continuous succession, rather than step by step. For the forward run, these control means may be actuated by the hand lever 177 and for the return run by the hand lever 178. Both control means are provided with valves, each of which has one side which may be acted upon by compressed air when a reversal is effected by the operation of the foot pedals 158 or 159. The step-by-step operation for the forward or return runs is in this manner automatically reestablished. Independently of this, it is, however, also possible, after the hand levers 177 and 178 have been set for the automatic operation, to actuate them at any time so as again to change to the step-by-step operation. A further hand lever 179 serves for releasing the toe and lateral grippers when they are in the extended position.

*Operation of the machine*

The operation of the machine proceeds as follows: At first, the upper of the shoe, the heel part of which has been preheated, is applied by hand around the last L and then held by means of the last upon the heel plate. The right foot pedal is then despressed, whereby the last L is clamped firmly against the support 40. Shortly after this clamping operation is completed, the heating plate 108 is lifted within the same work cycle against the heel part of the insole.

The individual further work cycles thereafter proceed as follows:

(1) Automatic adjustment of the last in accordance with the particular shank slope to attain the proper position of the front part of the shoe bottom relative to the front carriage. Automatic locking when the abutment 56 engages upon the shoe bottom.

(2) Starting of the front carriage together with the tools thereon until the engagement of the toe stop 60 occurs which results in a locking of the associated drive unit.

(3) Clamping of the front gripper 66 and, if necessary, a lateral adjustment of the toe of the shoe by a lateral shifting of the front gripper by means of the hand lever.

(4) Drawing by the closed front gripper with possibility of venting by the hand lever 179 if another correction of the shank is required. Pressure regulation of the tension of the front gripper by means of reducing valve 72.

(5) Clamping by the lateral grippers; if necessary, additional adjustment of the shank by the hand lever 98.

(6) Drawing out of the closed lateral grippers 67 and 68; if necessary, venting by actuation of hand lever 179 and adjustment by means of hand levers 77 or 98.

(7) Engagement of toe pressure member 105 upon the toe of the shoe and thereafter within the same work cycle forward movement and lifting of ball support underneath the bottom of the last.

(8) Lifting of shank lasting mechanism (FIGURE 8) until shank stop engages upon insole.

(9) Closing of shank grippers and wiping and lasting of lasting margin within this area.

(10) Forward movement and closing of heel saddle 18, simultaneously taking along the wipers 26 and retraction of the heating plate 108 to its original position.

(11) Closing, forward movement, and lifting of ball wipers 148 in cooperation with ball support 147, and thereby wiping and lasting of lasting margin within ball area; shortly before this, lateral grippers 67 and 68 open simultaneously and heel wipers 26 are also moved upwardly in the opened position.

(12) Heel wipers 26 in raised position carry out the first wiping movement.

(13) Heel wipers 26 disengage in the closed position.

(14) Heel wipers 26 are retracted in the opened position.

(15) Heel wipers 26 are again lifted.

(16) Heel wipers 26 carry out the second wiping movement. At the same time, the toe gripper 66 opens.

This work cycle completes the operation, and thereafter the clamped shoe preferably remains for a short time in this position in the machine. The length of this period may be determined by means of a timing device, not shown. Thereafter, the return movement of the machine and thus the release of the finished shoe may be carried out.

During the return movement, at first all the devices which are under pressure, for example, the ball, shank, and heel wipers, are moved back to their original positions. This is followed by the retraction of the toe suport, the return movement of the heel saddle, the opening of the shoe clamping means, and the return movements of the front and heel carriages to their original positions. After the last is released, the finished shoe may drop automatically from the machine into a suitable trough-shaped container.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. A machine for pulling-over, heel forming, and lasting of shoes by means of an adhesive within the area between the heel and the sides adjacent to the toe of the shoe and in a position in which the bottom surface of the last for the shoe upper faces downwardly, characterized by the fact that the heel part of the last together with the upper is adapted to be mounted in a fixed position on a first sliding carriage in such a manner that the toe part thereof faces the operator of the machine, that for lowering the toe part of the last, the last together with the first carriage is pivotable to an inclined plane in which the holding and supporting means and the tools for working on the shoe bottom are located, that the tools for working on the shoe bottom are mounted on a second sliding carriage which, after the last has been pivoted downwardly, is movable within this inclined plane, that after the machine has been started and the last has been mounted in a fixed position relative to the first or heel carriage, this carriage is movable to a position in which the front part of the last is in engagement with a stop member which is provided on the second carriage, and that this stop member is adapted to control the locking of the first carriage.

2. A machine as defined in claim 1, characterized by the fact that the first or heel carriage is movable along a curved guideway and adapted to be locked in a fixed position thereto.

3. A machine as defined in claim 2, characterized by the fact that, after the first or heel carriage has been locked, the second or front carriage is movable toward the first carriage until the tip of the last engages upon a stop member which controls the locking of the second carriage.

4. A machine as defined in claim 3, characterized by the fact that a roller is rotatably mounted on the free end of the toe bracing element.

5. A machine as defined in claim 1, characterized by the fact that, after the first or heel cariage has been locked, the second or front carriage is movable toward the first carriage until the tip of the last engages upon a stop member which controls the locking of the second carriage.

6. A machine as defined in claim 1, characterized by the fact that a roller is rotatably mounted on the free end of the toe bracing element.

7. A machine as defined in claim 2, characterized by the fact that a roller is rotatably mounted on the free end of the toe bracing element.

References Cited

UNITED STATES PATENTS

| | | | |
|---|---|---|---|
| 1,920,281 | 8/1933 | Standish | 12—126 |
| 3,039,121 | 6/1962 | Weinschenk | 12—10.1 |
| 3,099,846 | 8/1963 | Lane et al. | 12—10.1 |
| 3,157,897 | 11/1964 | Morrill | 12—10.5 |

PATRICK D. LAWSON, *Primary Examiner.*